United States Patent [19]

Hosaka et al.

[11] Patent Number: 5,223,950
[45] Date of Patent: Jun. 29, 1993

[54] DATA COMMUNICATION APPARATUS

[75] Inventors: Ryuji Hosaka; Naoki Suto; Tomoo Fukao; Naoharu Kido; Kazuyuki Tsukamoto; Minoru Yoshida, all of Saitama, Japan

[73] Assignee: Fuji Xerox Co., Ltd., Tokyo, Japan

[21] Appl. No.: 771,230

[22] Filed: Oct. 4, 1991

[30] Foreign Application Priority Data

Jan. 28, 1991 [JP] Japan .................................. 3-25187

[51] Int. Cl.$^5$ ............................................. H04N 1/00
[52] U.S. Cl. .................................................. 358/437
[58] Field of Search ........................... 358/434–439, 358/407, 442, 468; 379/100

[56] References Cited

U.S. PATENT DOCUMENTS

| | | | |
|---|---|---|---|
| 3,112,361 | 11/1963 | Kubota et al. | 358/437 |
| 5,040,077 | 8/1991 | Hamano | 358/437 |
| 5,050,005 | 9/1991 | Kagami | 358/434 |
| 5,055,945 | 10/1991 | Oguma et al. | 358/437 |
| 5,138,466 | 8/1992 | Saito | 358/435 |
| 5,140,439 | 8/1992 | Tanaka | 358/434 |

FOREIGN PATENT DOCUMENTS 64-86660 9/1987 Japan .
62-216584 3/1989 Japan .

Primary Examiner—Stephen Brinich
Attorney, Agent, or Firm—Finnegan, Henderson, Farabow, Garrett & Dunner

[57] ABSTRACT

A data communication apparatus in which if it is determined that a distant station presently in communication is a called station by a distant-station discriminating means, and a call-waiting signal is detected by a call-waiting-signal detecting means, a call-waiting-telephone controlling means is activated. This call-waiting-telephone controlling means switches over the line to the interrupting-station side by controlling a line switching means, and commences processing for an interrupt communication by a call-waiting telephone. Thereby, even if there has been an interrupt request signal, an interrupt communication is not allowed if a distant station presently in communication is in a chargeable state.

4 Claims, 8 Drawing Sheets

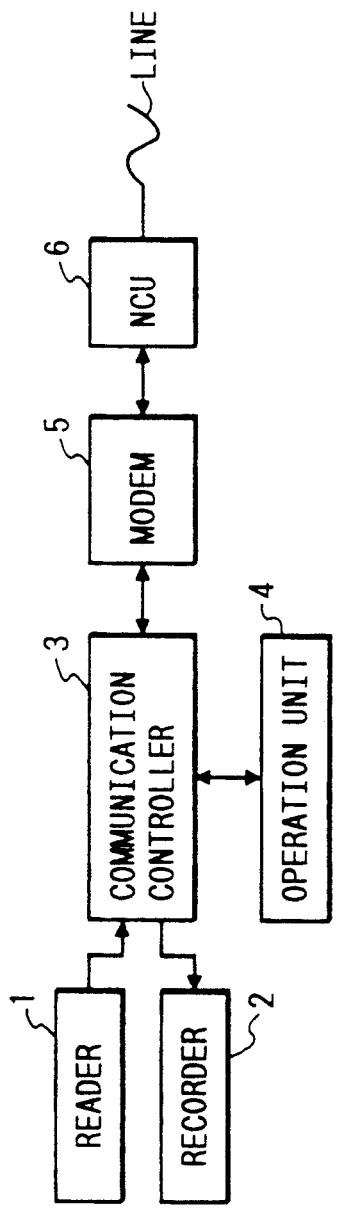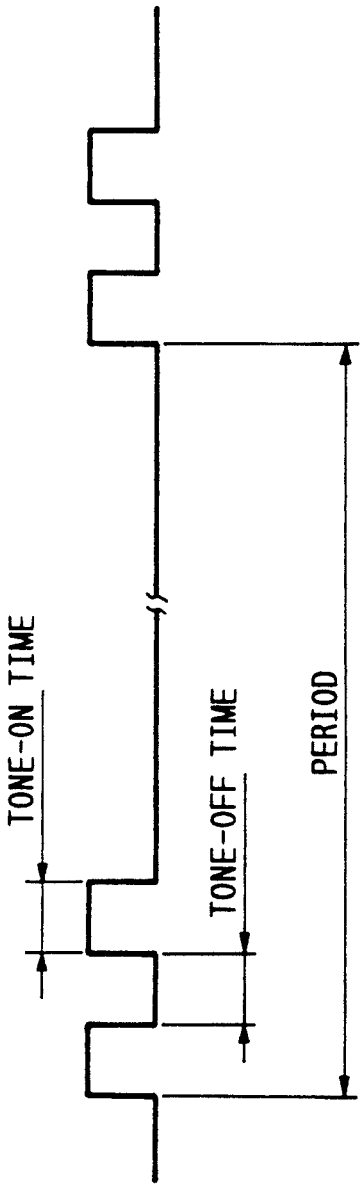

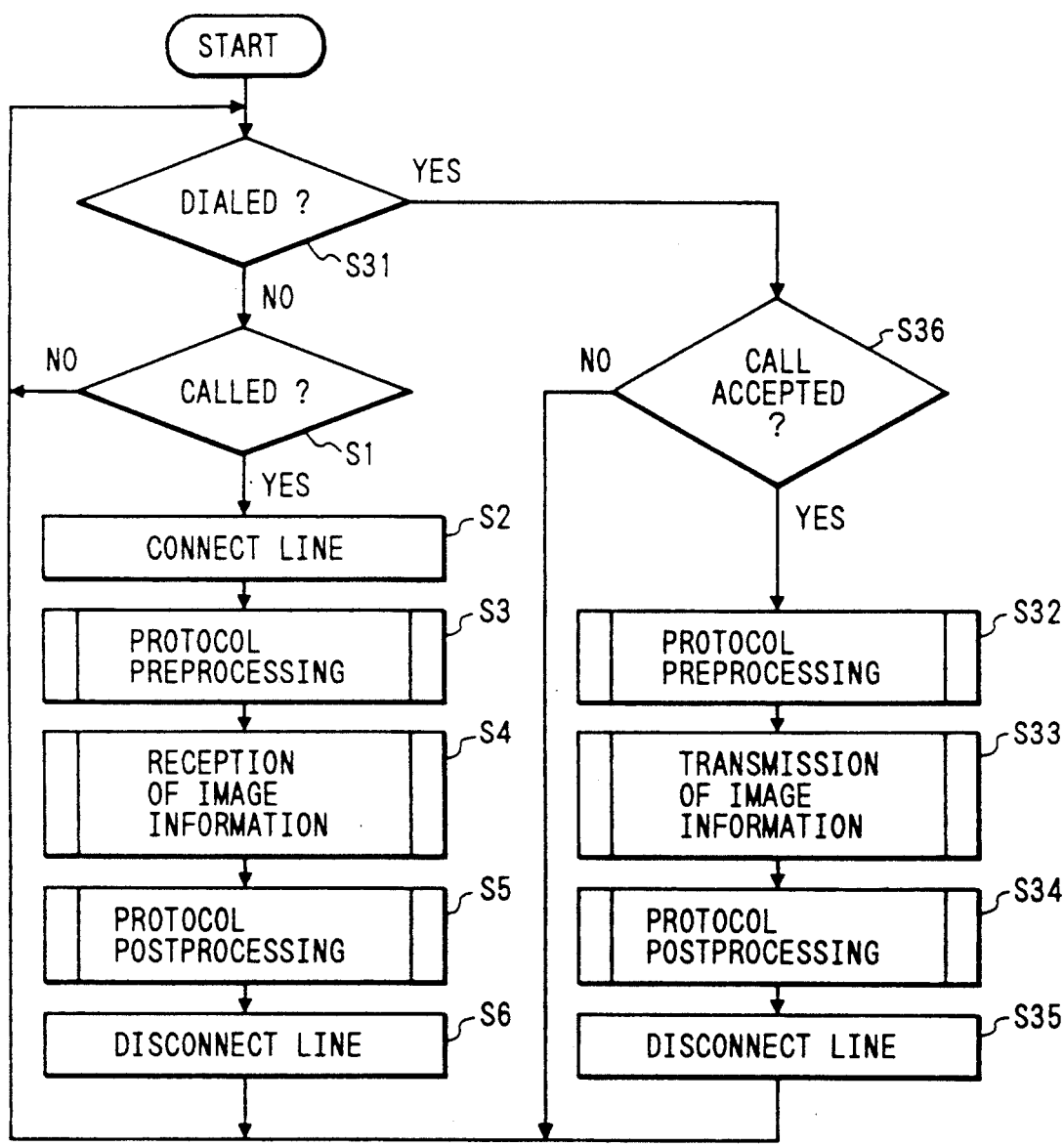

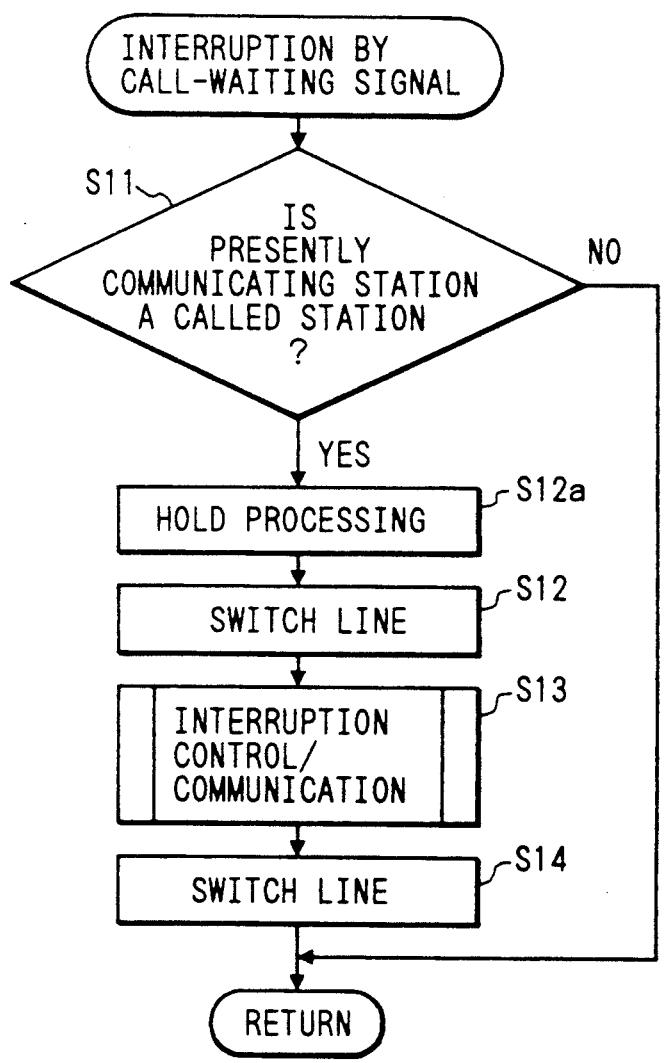

DATA COMMUNICATION APPARATUS

BACKGROUND OF THE INVENTION

The present invention relates to a data communication apparatus, and more particularly to a data communication apparatus such as a facsimile apparatus in which, if an interrupt request has been made by a call-waiting telephone, whether or not an interruption communication is to be effected is determined depending on whether a distant station is a calling station or a called station.

A call-waiting telephone service is provided by NTT (Nippon Telegraph & Telephone Co., Ltd.). This service allows an interrupt call by another distant station B while a call is being made between one's own station and a distant station A.

Specifically, in a case where the own station is making a call with the distant station A, if the distant station B dials the number of the own station, a predetermined call-waiting signal (interrupt request signal) is sent by an exchange to the own station. Then, if the own station operates a hook button in response to the call-waiting signal, a connection is established between the own station and the distant station B, and a predetermined call-waiting-service holding signal is transmitted from the exchange to the distant station A.

Then, after completion of the call with the distant station B, if the own station operates the hook button again, the own station is connected again to the distant station A.

In the following description, the two stations presently communicating with each other (the distant station A and the own station) will be each referred to simply as the transmitting station or receiving station, and the distant station B attempting an interrupt communication as the interrupting station.

The following are specifications of an example of a call signal and a holding signal of the call-waiting telephone service.
Frequency: 400±10 [Hz]
Output level: −16 [dBm] or less
Tone-on time: 70±10 [ms]
Tone-off time: 70±10 [ms]
Period: 4 [sec] or 8 [sec] (however, generally 4 [sec])

The signal waveform of this example is shown in FIG. 10.

If the call-waiting telephone service is to be received in a case where communication of image information is to be effected by connecting a facsimile apparatus to a telephone line, it suffices if the facsimile apparatus is provided with a means for detecting the call signal of the call-waiting telephone service, and the line is switched over in correspondence with the detection of the call signal.

Such a facsimile apparatus is disclosed in, for instance, Japanese Patent Application Laid-Open No. 62-216584, wherein if the call signal of the call-waiting telephone service is detected by the receiving station (or transmitting station), the line is connected to the interruption station at that point of time. Although a holding signal is outputted from an exchange to the transmitting station (or receiving station) which was in communication up until then, since a general facsimile apparatus is not provided with the capability of detecting the holding signal, the transmitting station (or receiving station) is placed in a state of no signal, so that the line is disconnected after the lapse of a predetermined time. Accordingly, the arrangement provided in the aforementioned publication is such that upon completion of communication with the interrupting station, the receiving station (or transmitting station) automatically dials the number of the transmitting station (or receiving station) which was the station at the other end of the line.

In contrast, Japanese Patent Application Laid-Open No. 64-86660 discloses a technique in which the receiving station (or transmitting station) which effected communication with the interrupting station effects a resetting operation with respect to the distant station with which it had been communicating up until then, before the lapse of a predetermined time from the time when the interrupt communication was started. By virtue of this resetting operation, the distant station does not disconnect the line during the interrupt communication.

In the technique disclosed in the aforementioned Japanese Patent Application Laid-Open No. 64-86660, since the distant station does not disconnect the line, it is substantially possible to set the distant station in a communication-held state.

With this technique, however, since the arrangement provided is such that the station which was called by a call-waiting signal allows the interrupt communication regardless of whether the distant station is a calling station or a called station, if the station concerned is a called station, for instance, the calling station which is the presently communicating distant station is forced to hold the communication.

Since the calling station side pays the fee of the communication line in generally, it is irrational to force the instruction for holding the line to the calling station.

SUMMARY OF THE INVENTION

The present invention has been devised to overcome the above-described drawbacks, and its object is to provide a data communication apparatus which does not allow an interrupt communication if the distant station presently in communication is in a chargeable state, even if an interrupt request signal has been received.

To overcome the above-described problems, the present invention is characterized in that a determination as to whether or not an interrupt communication with an interrupting station is to be executed is made on the basis of whether a distant station presently in communication is a called station or a calling station and whether or not an interrupt-request signal has been received from the interrupting station.

By discriminating whether the distant station is a called station or a calling station, it is possible to determine whether or not the distant station is in a chargeable state.

BRIEF DESCRIPTION OF THE DRAWINGS

FIG. 2 is a block diagram illustrating a hardware configuration of the first embodiment of the present invention;

FIG. 3 is a flowchart illustrating the basic operation of the first embodiment of the present invention;

FIG. 4 is a flowchart illustrating an interrupt operation in a case where a call-waiting signal has been received in the first embodiment of the present invention;

FIG. 10 is a diagram illustrating the signal waveforms of a call signal and a holding signal of a call-waiting telephone service.

PREFERRED EMBODIMENTS OF THE INVENTION

Figure 1:
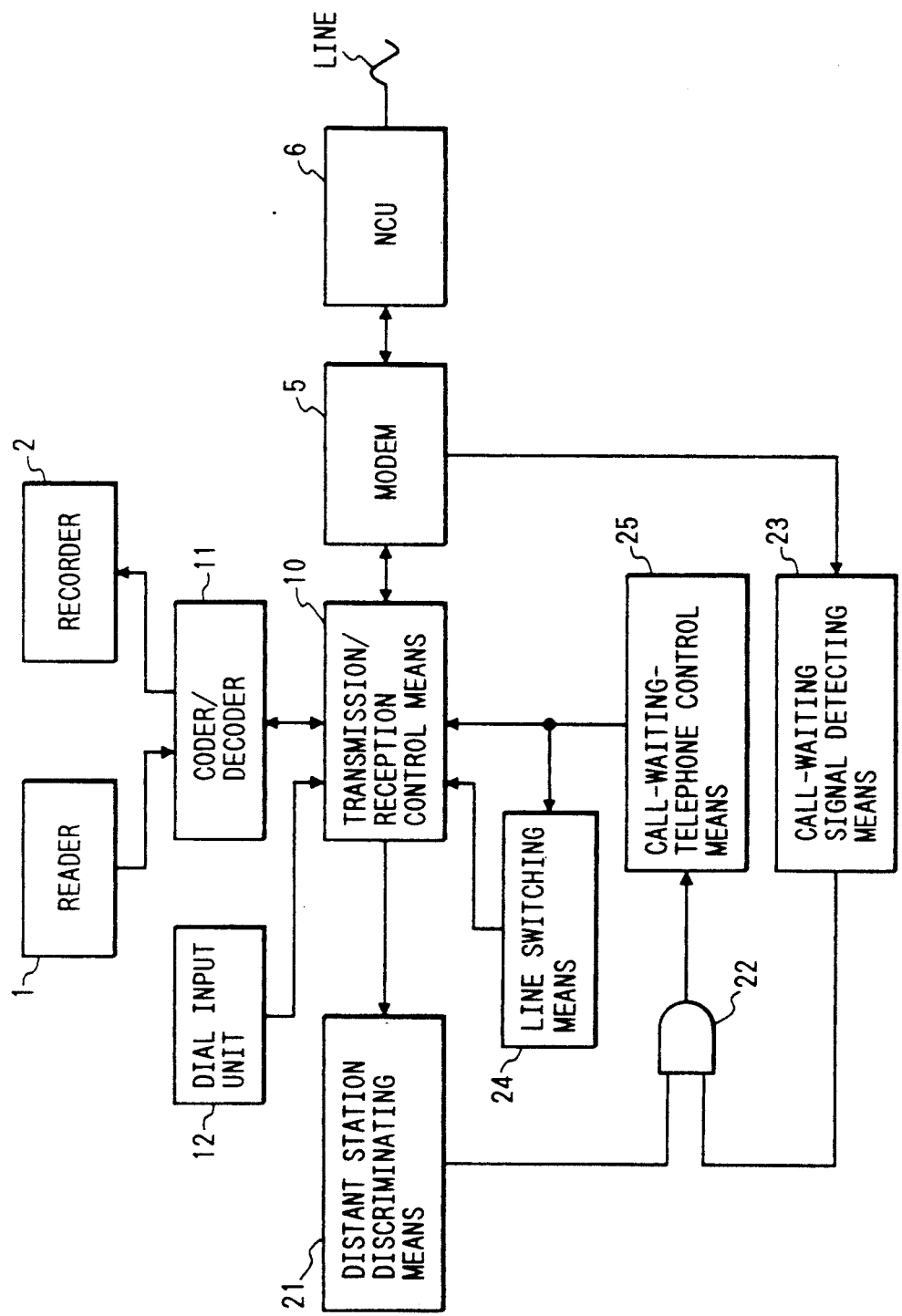
FIG. 1 is a functional block diagram of a first embodiment of the present invention.

Referring now to the drawings, a detailed description will be given of the present invention which is applied to a facsimile apparatus. FIG. 2 is a block diagram illustration a hardware configuration of a first embodiment of the present invention.

In the drawing, a reader 1 for reading the contents of a document and a recorder 2 for outputting image information received are connected to a communication controller 3. In addition, an operation unit 4 comprising various operation buttons for operating the facsimile apparatus, a display for displaying the state and the like of the facsimile apparatus, and a tone generator (none are shown) is also connected to the communication controller 3.

The communication controller 3 is connected to a modem 5, the modem 5 is connected to an NCU 6, and the NCU 6 is connected to a line.

The communication controller 3 has a microcomputer for controlling the operation necessary for transmitting and receiving the image information of the facsimile apparatus as well as various operations which will be described later.

Various protocol signals and image information are transmitted to the line via the communication controller 3, the modem 5, and the NCU 6, or are inputted to the communication controller 3 from the line via the NCU 6 and the modem 5.

The modem 5 is provided with the function of detecting the call signal of a call-waiting telephone. As described before, the call signal of the call-waiting telephone and some of the holding signals are signals of predetermined patterns of 400 [Hz]. When the signal is transmitted from an exchange, in a case where it is a call signal, that signal is superposed on a predetermined protocol signal necessary for image information or for the communication of the image information so as to be inputted to the facsimile apparatus. On the other hand, in a case where the signal is a holding signal having the predetermined pattern of 400 [Hz], since the distant station is effecting communication with the interrupting station, there is no signal which is superposed on that signal. Accordingly, if the signal having the predetermined pattern of 400 [Hz] is detected, it is possible to determine whether that signal is a call signal or a holding signal of the call-waiting telephone depending on whether or not the carrier of image information or the protocol signal is being received at the same time. It is relatively easy to add such a function to an ordinary modem 5.

Of course, the modem 5 need not be provided with all the aspects of the function of detecting the call signal. In other words, it is possible to adopt the following arrangement. By providing a 400 [Hz] band-pass filter, a determination is made by the communication controller 3 as to whether or not the signal outputted via the filter has the aforementioned pattern. If the signal of that pattern is detected, the call signal or the holding signal is detecting depending on whether or not the image information or the predetermined protocol signal is detected.

In addition, if the holding signal is not the predetermined pattern but is music or voice, the carrier of the protocol signal is not detected and, at the same time, a plurality of frequencies (the voice or music cannot be a monotone) are detected, whereby it can be determined that the call is being held by the distant station. Such a function can be readily realized by using a frequency detection circuit (there is a type in which it is incorporated in a modem) which is provided in the facsimile apparatus.

Next, the operation of the first embodiment will be described hereinafter. FIG. 3 is a flowchart illustrating the basic operation (main routine) of the first embodiment of the present invention.

First, in Step S31, a determination is made as to whether or not dialing has been effected. In Step S1, it is determined whether or not a call has been received (an ordinary call other than a call by a call-waiting telephone). If neither has been effected, the operation returns to Step S31.

If dialing has been effected, in Step S36, it is determined whether or not the distant station has accepted to receive the call. If it has not accepted, the operation returns to Step S31.

If the call has been accepted, in Steps S32–S34, predetermined protocol preprocessing, transmission of image information (PIX), and predetermined protocol post-processings are executed, respectively, for transmission of image information. Subsequently, the line is disconnected in Step S35, and the processing concerned returns to Step S31.

In Step S1, if a call is detected, the line is connected in Step S2, and predetermined protocol preprocessing for receiving image information is executed in Step S3.

Furthermore, in Steps S4 and S5, reception of the image information and predetermined protocol post-processing are executed. Subsequently, the line is disconnected in Step S6, and the processing concerned returns to Step S31. It should be noted that although an illustration is not given, the image information received is outputted (printed) at a predetermined timing.

In a case where the facsimile apparatus for effecting the above-described operation is communicating (transmitting or receiving), if an interrupting station calls the facsimile apparatus, a call-waiting signal is outputted by the exchange to the facsimile apparatus. Upon detection of the call-waiting signal, the processing shown in FIG. 4 is executed by the interruption during the processing shown in FIG. 3.

FIG. 4 is a flowchart illustrating an interrupt operation in the case where the call-waiting signal is received in the first embodiment of the present invention.

Upon reception of the call-waiting signal, in Step S11, it is determined whether or not the distant station presently in communication is a called station, i.e., whether or not the own station is a calling station. If the distant station is not a called station, the interrupt processing is quitted, and the operation returns to the routine persisting prior to the interruption.

If the distant station is a called station, in Step S12a, processing for setting the communication in a state of being held is executed without disconnecting the line with respect to the distant station, and in Step S12 the line is switched over to the interrupting station.

Then, in Step S13, communication of image information by an interruption by the call-waiting signal is executed. Details of this processing in Step S13 for setting the distant station in a communication-held state will be described later.

Upon completion of the aforementioned processing, in Step S14, the line is switched over again to the earlier distant station. Subsequently, the interrupt processing completes, and the operation returns to the routine persisting prior to the interruption.

Any technique may be used as the processing for setting the distant station in the communication-held state without disconnecting the line. For instance, the techniques shown in (A) to (C) below may be used.

(A) As disclosed in Japanese Patent Application Laid-Open No. 64-86660, a resetting operation is effected with respect to the earlier distant station after the lapse of each predetermined time from the time when the line was switched over for an interrupt communication. In this configuration, it suffices if only the station which is called by the call-waiting telephone is a unique apparatus.

(B) Both the own station which is called by the call-waiting telephone and the station (earlier distant station) communicating with the own station are made unique apparatuses. Commands for holding a communication are prepared in advance between the own station and the distant station, and when there has been a call-waiting signal, the commands are transmitted and received therebetween, whereby an instruction for holding the communication is given to the distant station.

Figure 5:
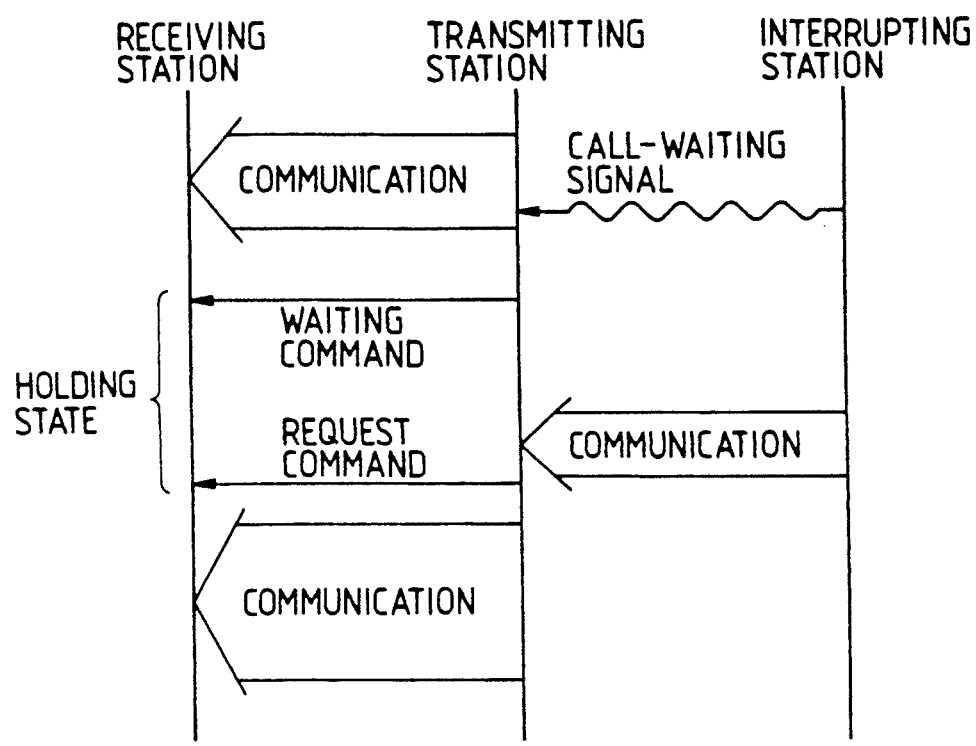
FIG. 5 is a timing chart illustrating an example of processing for setting a distant station in a communication-held state.

FIG. 5 is a time chart illustrating an example of such processing.

As is evident from FIG. 5, in this example, in case where a call-waiting signal has been applied to the transmitting station (the calling station), the transmitting station transmits a waiting command (a unique command) to the receiving station (the called station) and thereby instructs the receiving station to set the communication in a temporarily-held state without disconnecting the line. Subsequently, a communication is effected with the interrupting station. At the time of transmission and reception of this waiting command, the state of communication at that time (a communication speed, a communication mode, a transmitted page and the like if the transmitting station is carrying out memory transmission; these data will be hereinafter referred to simply as the communication data) is stored by both the receiving station and the transmitting station. Then, upon completion of the communication with the interrupting station, the transmitting station transmits a request command (a unique command) to the receiving station, thereby instructing resumption of the communication.

The receiving station which was the earlier distant station is arranged in advance such that the communication is held without disconnecting the line upon reception of the waiting command, and the communication is resumed upon reception of the request command.

This resumption of communication is effected on the basis of the communication data stored at the time of the starting of the interrupt communication. It should be noted that an arrangement may be alternatively provided such that the starting of the interrupt communication is effected not immediately upon reception of the call-waiting signal but upon completion of the transmission of one page of the transmitted document. If such an arrangement is provided, the originality of the data will not be lost.

(C) As same as the above-described (B), both the own station which is called by the call-waiting telephone and the station (earlier distant station) communicating with the own station are made unique apparatuses. The distant station is automatically set into the communication holding state without disconnecting the line when the holding signal of the interruption is detected. Thereafter, when the holding signal is disappear, the predetermined commands are transmitted and received therebetween to acknowledge resumption of communication, thereby the communication is resumed.

Figure 6:
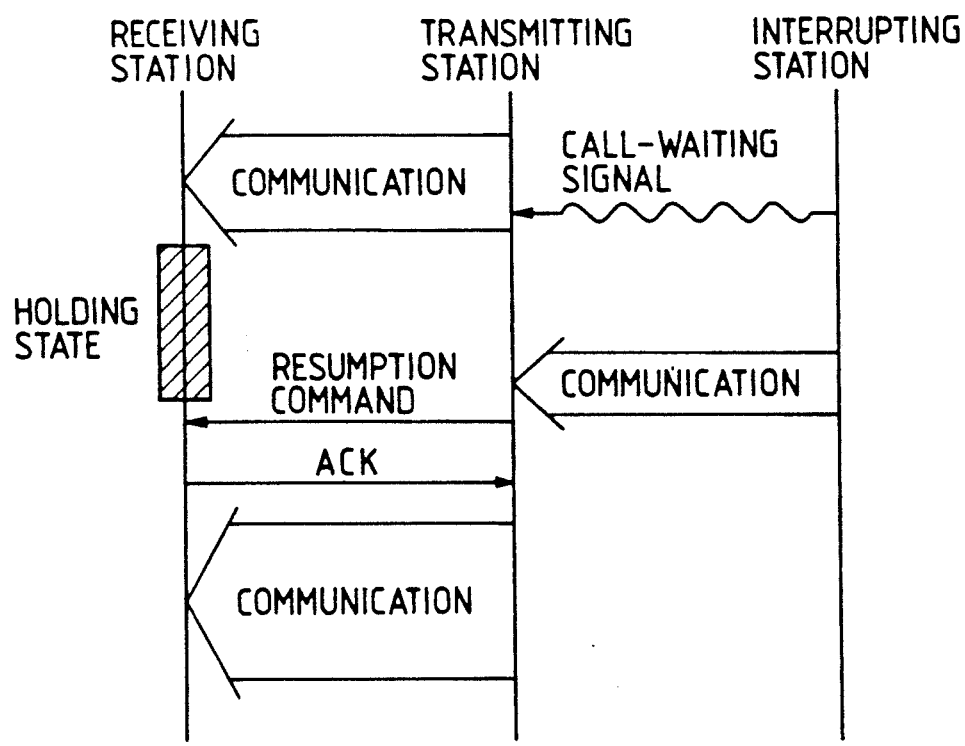
FIG. 6 is a timing chart illustrating another example of processing for setting the distant station in the communication-held state.

FIG. 6 is a time chart illustrating an example of such processing.

As is evident from FIG. 6, in the case of where the transmitting station (calling station) begins to communicate with the interruption station, the holding signal is transmitted to the receiving station (called station) from an exchanger. In response to detection of the holding signal, the receiving station automatically sets into the communication holding state without disconnecting the line. The transmitting station stores the communication data at the time of beginning of the interruption communication, and the receiving station stores the communication data at the time of detecting of the holding signal.

Upon the holding signal disappeared, the receiving signal proceeds the procedure to resume the communication with the transmitting station. In the example of FIG. 6, a resumption command and a ACK command (both unique commands) are transmitted and received therebetween. After this command transmission and reception, the communication is resumed.

This communication resumption is carried out in accordance with the communication data stored at the time of starting of the interruption communication. It should be noted that an arrangement may be alternatively provided such that the starting of the interruption communication is not carried out immediately upon the reception of call-waiting signal but upon completion of the transmission of one page of the document.

FIG. 1 is a functional block diagram of the first embodiment of the present invention. In FIG. 1, the same reference numerals as those shown in FIG. 2 denote the same or equivalent portions.

In FIG. 1, the image information read by the reader 1 is transmitted to the line via a coder/decoder 11, a transmission/reception controlling means 10, the modem 5, and the NCU 6. Conversely, the image information received through the line is inputted to the recorder 2 via the NCU 6, the modem 5, the transmission/reception controlling means 10, and the coder/decoder 11 so as to be hard-copied.

A distant-station discriminating means 21 discriminates whether the distant station is a called station or a calling station If the distant station is a called station, a "1" is outputted to one input terminal of an AND gate 22. As a result, the AND gate 22 is opened.

Constantly during a communication, a call-waiting-signal detecting means 23 detects whether or not the call-waiting signal has been received. If the call-waiting signal has been detected, the call-waiting-signal detecting means 23 outputs a "1" to the other terminal of the AND gate 22. Accordingly, if the distant station is the called station, and the call-waiting signal has been detected, a call-waiting-telephone controlling means 25 is activated.

This call-waiting-telephone controlling means 25 instructs a line switching means 24 to effect line-switching control such as any one of the above-described items (A) to (C), and causes the transmission/reception controlling means 10 to execute predetermined processing for executing the holding of the communication without causing the distant station to disconnect the line, as in any one of the above-described items (A) to (C).

The line switching means 24 effects a hooking operation when the line is switched over.

Next, a second embodiment will be described. The hardware configuration of this second embodiment is similar to the one shown in FIG. 2.

In this second embodiment, the operation of detecting the call-waiting signal is executed only when the distant station is a called station. Accordingly, the interrupt processing as a result of detection of the call-waiting signal is one in which the processing of Step S11 in FIG. 4 is excluded.

Figure 7:
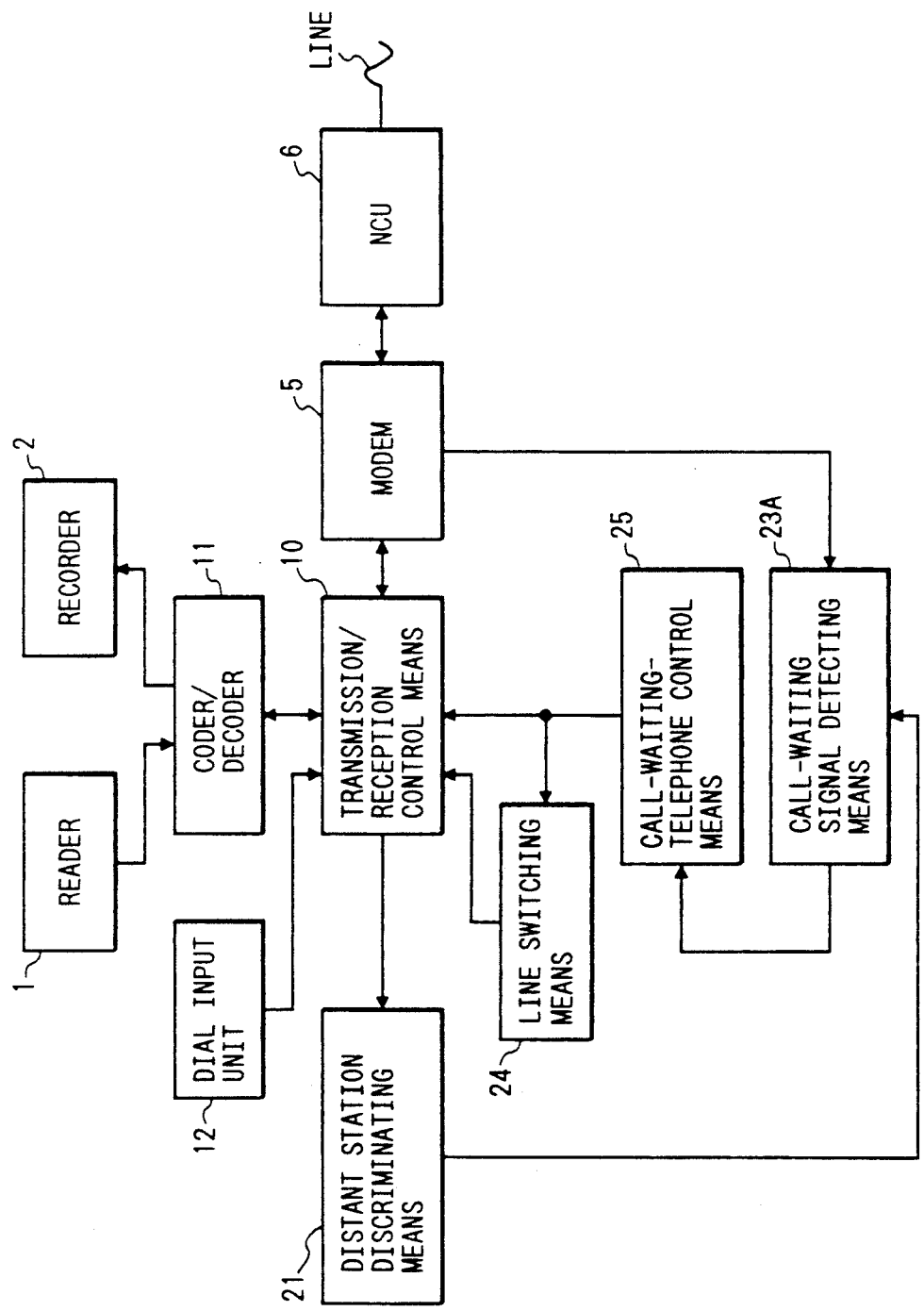
FIG. 7 is a functional block diagram of a second embodiment of the present invention.

FIG. 7 is a functional block diagram of the second embodiment of the present invention. In FIG. 7, the same reference numerals as those shown in FIG. 1 denote the same or equivalent portions, so that a description thereof will be omitted.

In FIG. 7, if the distant-station discriminating means 21 has determined that the distant station is a called station, the distant-station discriminating means 21 makes active a call-waiting-signal detecting means 23A. This call-waiting-signal detecting means 23A detects the call-waiting signal during communication only when the activating has been carried out.

In accordingly, in this embodiment, if the distant station is a calling station, the call-waiting-signal detecting means 23A is not activated, and the call-waiting signal is not therefore detected. Hence, the load at the time of, for instance, reception of image information is alleviated.

Next, third embodiment of the present invention will be described. The hardware configuration of this third embodiment is similar to the one shown in FIG. 2.

Figure 8:
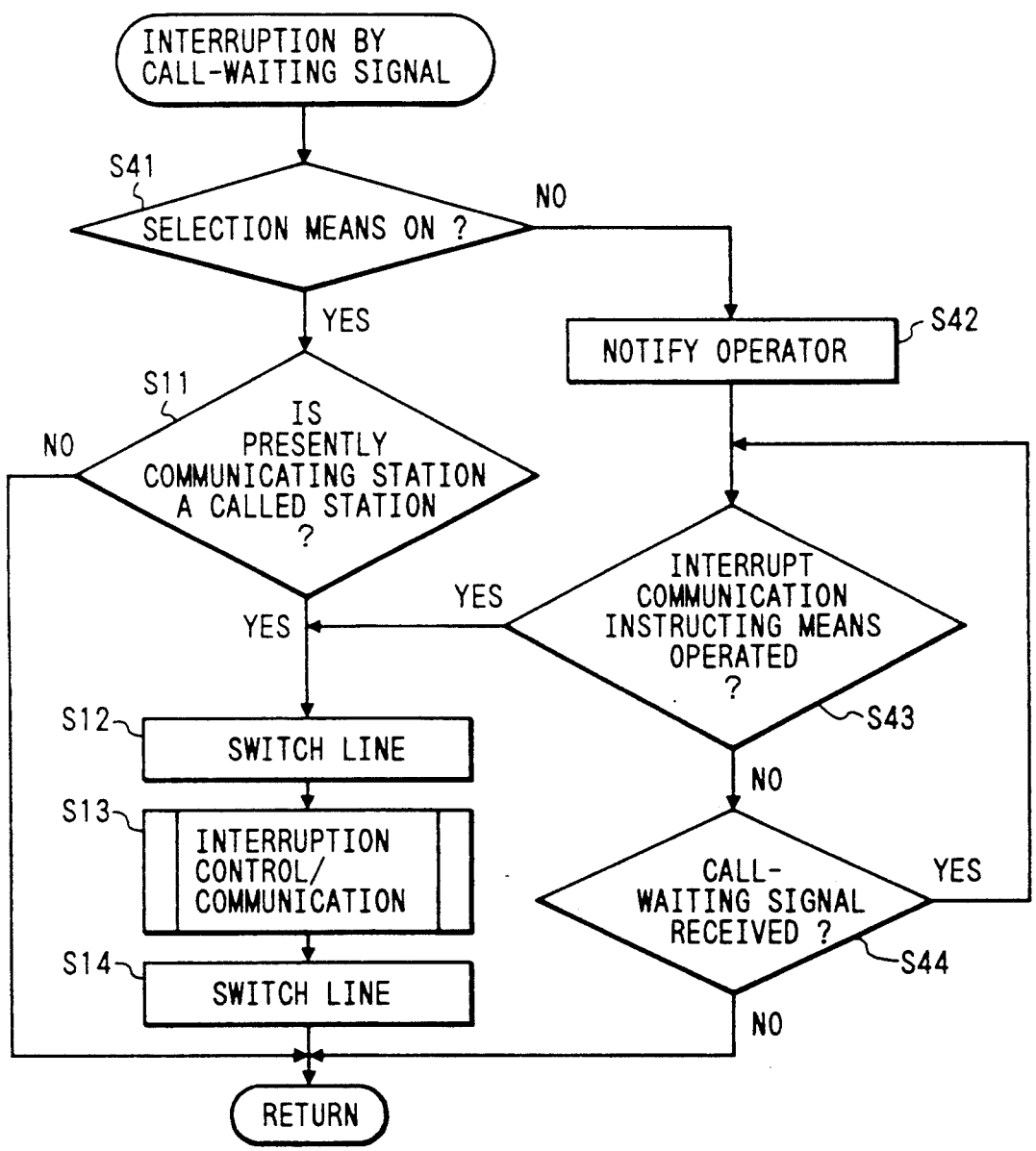
FIG. 8 is a flowchart illustrating an interrupt operation in a case where a call-waiting signal has been received in a third embodiment of the present invention.

FIG. 8 is a flowchart illustrating an interrupt operation in a case where the call-waiting signal has been received in the third embodiment of the present invention, and this drawing is similar to FIG. 4. In addition, since in FIG. 8 the same reference numerals as those shown in FIG. 4 denote the same or equivalent processing, a description thereof will be omitted.

In this embodiment, the detection of the call-waiting signal is effected always regardless of whether the distant station is a called station or a calling station.

In FIG. 8, if the call-waiting signal is detected, it is determined in Step S41 whether or not a selection means has been turned on. This selection means is a switch for selecting from the method for switching the line to the interrupting-station side only when the distant station is a called station, as shown in FIG. 4, on the one hand, and the method for switching the line to the interrupting-station side when an instruction for switching the line has been given by the operator regardless of whether the distant station is a called station or a calling station on the other. The setting of this selection means is effected in advance by the operator of the facsimile apparatus concerned.

If the selection means has been turned on, the processing concerned proceeds to Step S11.

If the selection means has been turned off, in Step S42 a notification is given to the operator of the facsimile apparatus concerned by means of light, sound or the like.

In Step S43, it is determined whether or not an interrupt-communication instructing means has been operated by the operator. If it has been operated, the operation proceeds to Step S12. If the interrupt-communication instructing means has not been operated, a determination is made in Step S44 as to whether or not the call-waiting signal has already been detected (i.e., whether or not the interrupting station is still calling). If the call-waiting signal has been detected, the operation returns to Step S43. If the call-waiting signal has not been detected, the interrupt processing is completed, and the operation returns to the routine persisting prior to the interruption.

Figure 9:
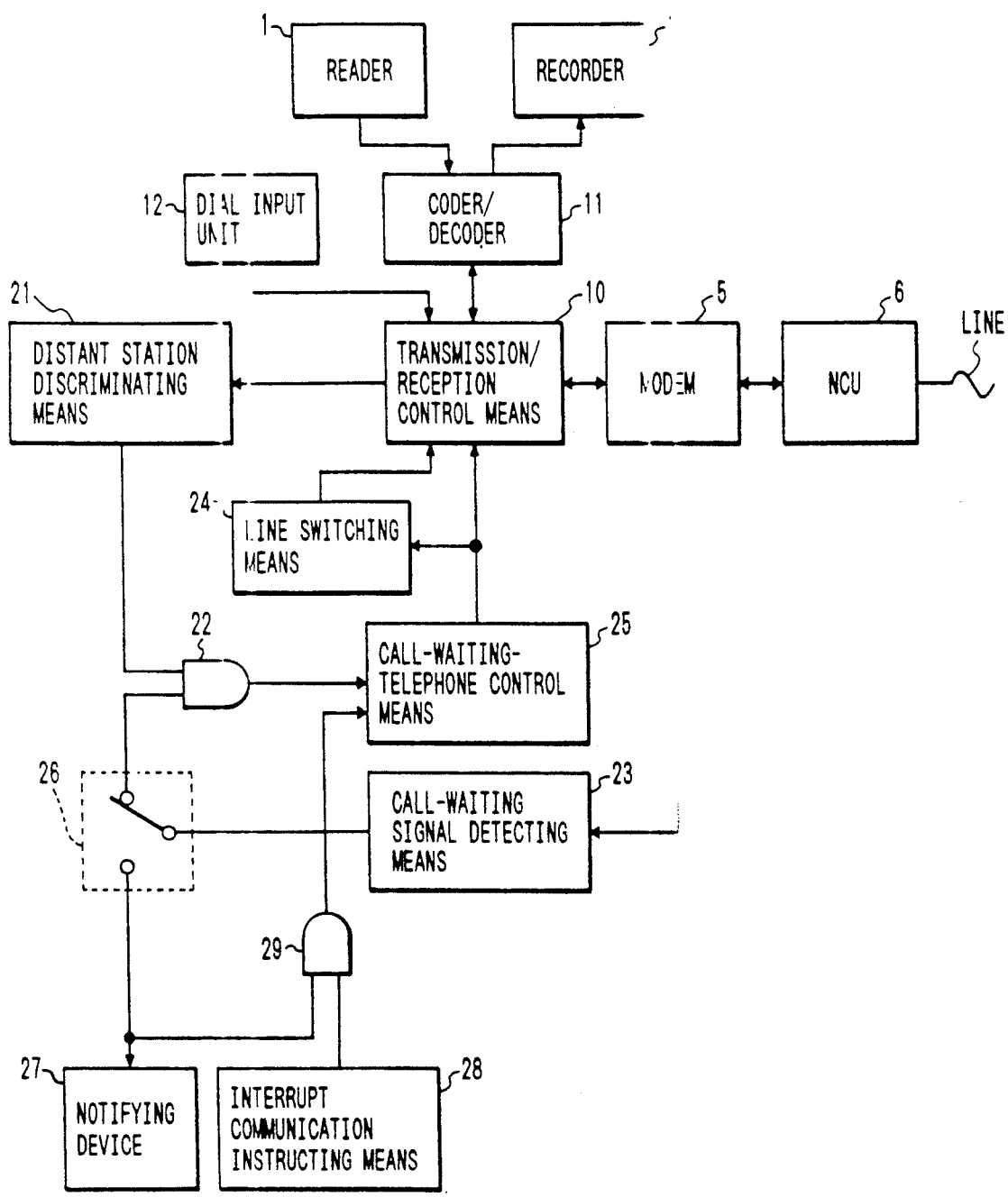
FIG. 9 is a functional block diagram of the third embodiment of the present invention.

In FIG. 9 illustrates a facsimile apparatus having the function of the third embodiment of the present invention. In FIG. 9, the same reference numerals as those shown in FIGS. 1 and 7 denote the same or equivalent portions.

In FIG. 9, when the call-waiting-signal detecting means 23 detects the call-waiting signal, an output signal to that end is outputted to an AND gate 22 or 29 via a selecting means 26. Accordingly, if the selecting means 26 has been set to the AND gate 22 side, the line is switched over to the interrupting-station side only when the distant station is a called station, as shown in FIG. 1, and control for a call-waiting-telephone interrupt communication is started by the call-waiting-telephone controlling means 25.

In a case where the selecting means 26 has been set to the AND gate 29 side, if the call-waiting signal is detected, a notifying device 27 is activated so as to notify the operator of the facsimile apparatus by means of sound, light or the like to the effect that there has been a call by a call-waiting telephone. In addition, the AND gate 29 is opened.

If the operator operates an interrupt-communication instructing means 28 while the AND gate 29 is being open (i.e., while the interrupting station is calling), the call-waiting-telephone controlling means 25 is activated.

Although in the above-described embodiments a communication with the interrupting station is executed only when the distant station presently in communication is a called station, it is possible to execute a communication with the interrupting station only when the distant station is conversely a calling station.

Although in the above-described embodiments a description has been given by citing as an example an interrupt communication necessitated by a call-waiting telephone, the present invention may be applied to various other types of interrupt communication. That is, the present invention may be applied to, for example, an interrupt communication system adopted by ATT of the United States. The call signal of this system is a combination of 480 [Hz] and 620 [Hz] signals and is outputted at 60 [IPM].

Furthermore, although a description has been given of the case in which the present invention is applied to the facsimile apparatus for effecting communication of image information, the present invention is applicable to all data communication apparatuses (personal computer communication apparatuses and the like) provided with a modem and adapted to effect data communication through the transmission and reception of a predetermined protocol. In this case, of course, the data to be communicated may not be image information.

In accordance with the data communication apparatus according to the present invention, by discriminating whether the distant station is a called station or a calling station, it is possible to determine whether or not the distant station is in a chargeable state. Accordingly, if the distant station presently in communication is a data communication apparatus which is to be charged, it is not to cause the distant station to hold the communication.

Further, it is possible to select from the controlling of execution of an interrupt communication as described-above, and the controlling of execution of an interrupt communication through an instruction by the operator of the data communication apparatus.

What is claimed is:

1. A data communication apparatus comprising:
   distant-station discriminating means for discriminating whether or not a distant station presently in communication is a called station;
   interrupt-request-signal detecting means for detecting reception of an interrupt-request signal from an interrupting station during communication with the distant station; and
   interrupt-communication controlling means for executing an interrupt communication with the interrupting station,
   wherein the interrupt-communication controlling means is activated in response to outputs of the distant-station discriminating means and the interrupt-request-signal detecting means.

2. A data communication apparatus as claimed in claim 1, wherein said interrupt-communication controlling means is activated when the distant station is the called station and the interrupt-request-signal is detected.

3. A data communication apparatus as claimed in claim 1, wherein said interrupt-request-signal detecting means is activated only when said distant-station discriminating means discriminates that the distant station is a called station.

4. A data communication apparatus as claimed in claim 1, further comprising:
   notifying means for notifying an occurrence of interruption to an operator, when the interrupt-request signal has been received;
   interrupt-communication instructing means for instructing to execute an interrupt communication with the interrupting station by the operator; and
   selecting means for selecting the activating of the interrupt-communication controlling means from on the basis of the outputs of the distant-station discriminating means and the interrupt-request-signal detecting means and on the basis of the instruction by the interrupt-communication instructing means.

* * * * *